United States Patent [19]

Aguilar

[11] Patent Number: 5,138,986

[45] Date of Patent: Aug. 18, 1992

[54] INTERNAL COMBUSTION ENGINE STARTING CONTROL TO PREVENT UNAUTHORIZED STARTING

[76] Inventor: Ricardo Aguilar, c/o Central Auto Supply, 5014 Gateway East, El Paso, Tex. 79905

[21] Appl. No.: 500,548

[22] Filed: Mar. 28, 1990

[51] Int. Cl.$^5$ .................. B60R 25/04; F02N 15/06
[52] U.S. Cl. .................. 123/179.3; 123/179.25; 290/38 R; 307/10.4; 361/171; 411/410; 411/911
[58] Field of Search ........... 123/179 B, 198 B, 179 R, 123/179 M; 307/10.3, 10.4, 10.5; 180/287; 290/48, 38 R; 361/171; 411/911, 410, 403, 402

[56] References Cited

U.S. PATENT DOCUMENTS

| | | | |
|---|---|---|---|
| 3,411,152 | 11/1968 | Jackson | 361/171 |
| 3,544,804 | 12/1970 | Gaumer et al. | 307/10.4 |
| 3,584,486 | 6/1971 | Trip et al. | 361/171 |
| 3,673,912 | 7/1972 | Herr | 411/410 |
| 3,756,341 | 9/1973 | Tonkowich et al. | 123/198 B |
| 3,784,839 | 1/1974 | Weber | 307/10.4 |
| 3,796,889 | 3/1974 | Fradkin et al. | 307/10.4 |
| 4,051,548 | 9/1977 | Hamada | 361/171 |
| 4,209,709 | 6/1980 | Betton | 307/10.4 |
| 4,292,541 | 9/1981 | Ambrosius | 307/10.5 |
| 4,342,210 | 8/1982 | Denningham | 361/171 |
| 4,533,016 | 8/1985 | Betton | 180/287 |
| 4,545,343 | 10/1985 | Cook et al. | 123/198 B |
| 4,672,225 | 6/1987 | Hanisko et al. | 307/10.5 |

Primary Examiner—Andrew M. Dolinar
Attorney, Agent, or Firm—Raymond N. Baker

[57] ABSTRACT

A novel machine with an internal combustion engine, and practical use-control means to prevent an unauthorized person from starting such engine, and anti-bypass means to prevent a knowledgeable prepared unauthorized person from defeating use-control means within a practical period of time as a feasible means for unauthorized starting of the engine. Use-control means require a proper authorization code be entered into code-input means before enabling engine starting. Anti-bypass means include enclosing parts of the use-control means within a tamper-proof enclosing-component and selecting such parts and components so that use-control means cannot be manipulated to start the engine by an unauthorized user within a practical amount of time. In one embodiment a solenoid component containing a shielded enclosure and two solenoids is attached to the starter-motor of a car or truck using novel one-way fasteners. A controller will not signal a power regulator to energize engagement means to transfer work from a starter-motor to the engine for starting the engine until the controller receives code-signals from the code-input means that conform with predetermined requirements. The shielded enclosure protects the controller and power regulator of use-control means from environmental hazards and prevents manipulation of such parts for unauthorized starting; and, there are no external connections which could be energized to activate engagement means without knowing the authorization code.

37 Claims, 6 Drawing Sheets

INTERNAL COMBUSTION ENGINE STARTING CONTROL TO PREVENT UNAUTHORIZED STARTING

This invention relates to machines with internal combustion engines that an unauthorized person may attempt to start, and in which such unauthorized starting or subsequent use could lead to harm, and in which practical apparatus that prevent such starting are provided. Particularly, this invention utilizes novel practical apparatus and methods of operation including user-input of an authorization code to prevent unauthorized starting of an internal combustion engine; and, which does not substantially interfere with authorized use.

Contributions of the invention include novel use-control means to prevent unauthorized starting that comprises apparatus which require the user to input an authorization code before the internal combustion engine will start. The invention also includes novel anti-bypass means to prevent an unauthorized person from bypassing use-control means, such that if the unauthorized person understands the system, and has special tools and replacement parts, the apparatus cannot be feasibly bypassed within a practical amount of time.

The invention also includes recognition of limitations of the prior art and the analysis of methods to prevent unauthorized starting which lead to the selection of novel apparatus and methods of operation described below. The advantages and contributions are discussed with detailed descriptions of drawings that illustrate such contributions in which:

Figure 1:
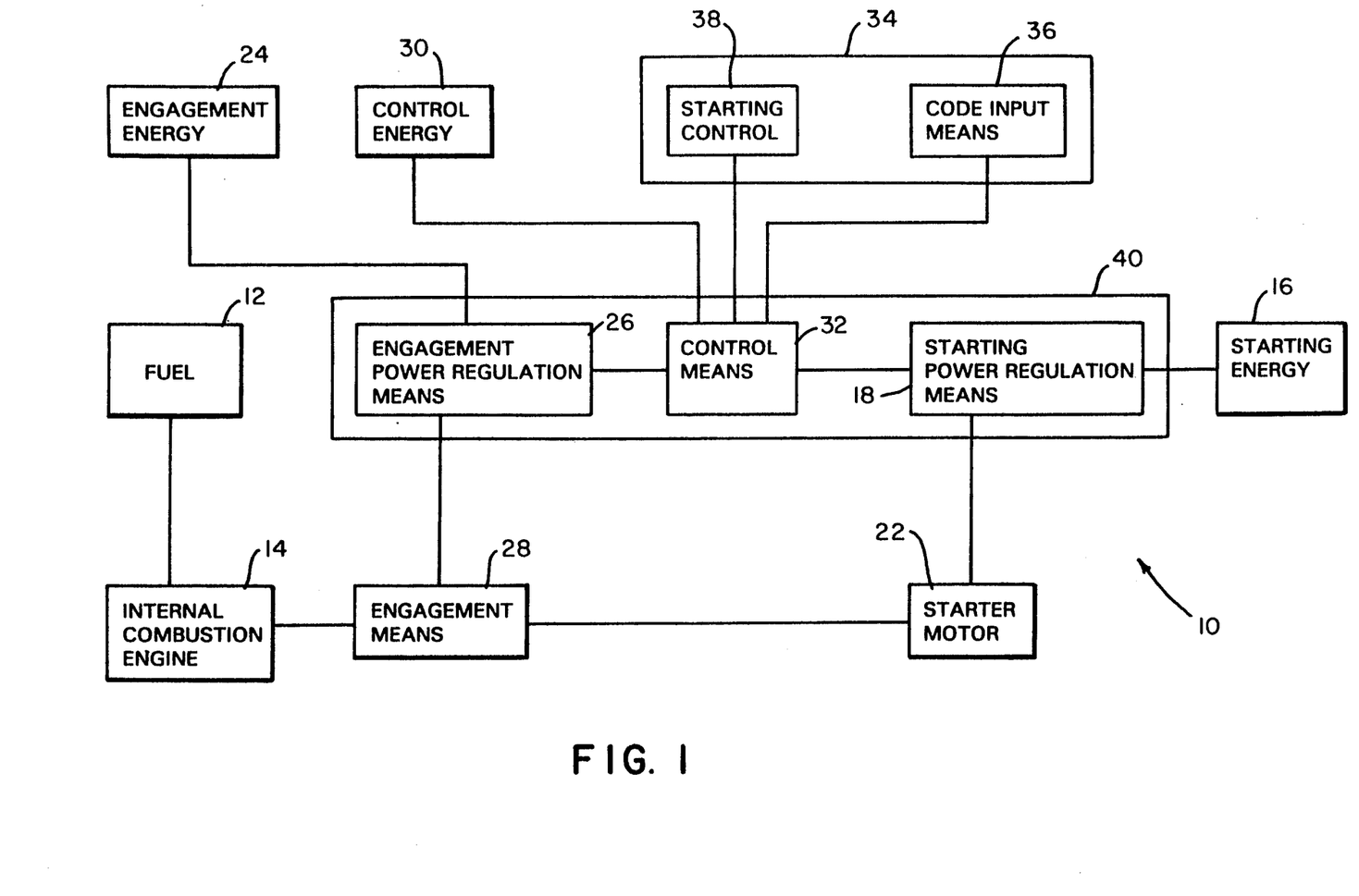
FIG. 1, a block diagram, illustrates the functional components of the machine of the invention.

The machine of the invention 10 of FIG. 1 comprises a source of combustible fluid fuel 12 to supply fuel flowing to an internal combustion engine 14 to convert the fuel into work for the machine. Source of starting-energy 16 is connectable through starting power-regulation means 18 in order to regulate the flow of starting-energy to starter-motor 22 which converts the starting-energy to starting-work. Source of engagement energy 24 is connectable through engagement power-regulation means 26 in order to regulate the flow of engagement energy to engagement means 28 which enable transfer of starting-work from the starter-motor to the engine in order to increase the speed of the engine to a minimum starting speed to start the engine.

A source of control-energy 30 is connectable to control means 32 which read inputs, determine whether the inputs comply with pre-defined requirements, and depending upon such determination, respond by generating outputs. Such inputs include input-signals from user-input means 34 comprising code-input means 36 to generate code-signals, and starting-control means 38. A user inputs an authorization code into code-input means 36 which transmits code-signals to control means 32. If the code-signals comply with pre-defined authorization code requirements, the control means output control-signals to engagement and starting power-regulation means 18,26 to enable engine starting. Then the user activates starting-control means 38 to generate a starting-sequence initiation input-signal transmitted to control means which output control-signals to engagement power-regulation means 26 to control engagement; and output control-signals to starting power-regulation means 18 to control operation of starter-motor 22. Finally, the user activates starting-control means to generate a starting-sequence termination input-signal transmitted to control means 32 which output control-signals to terminate such starting-sequence.

The machine enforces a minimum delay between each authorization code input to prevent guessing such authorization code as a feasible means of unauthorized starting. For example, in one embodiment whenever a starting-sequence initiation signal is received by control means 32 starting power-regulation means 18 is signaled to provide starting-energy to operate starter-motor 22, but control means will not signal engagement power-regulation means 26 to supply engagement energy to operate engagement means 28 unless the control means has received code-signals that comply with pre-determined authorization code requirements. The machine does not disclose any indication of authorization code input error except that the engine does not start thus requiring an unauthorized person to test each authorization code guess.

Use-control means comprise starting power-regulation means 18, engagement power-regulation means 26, and control means 32. Parts of such use-control means are contained within a shielded enclosure 40 which is contained within enclosing-component of machine 10.

Combustible fluid fuels 12 include gasoline, and diesel oil, hydrogen, and natural gas, and similar fuels; and internal combustion engines include turbine, rotary, piston, and similar engines. The sources of energy 16,24,30 can be the same source or different sources of electrical, hydraulic, pneumatic energy, or any other source of controllable energy, or combinations of such sources. User-input means 34 can be one means or multiple means including push-buttons, sliding, or presence indication switches. The code-input means may comprise multiple momentary-contact push-button code-input switches for sequential code-input or may comprise one switch for inputting code as timed pulses, which may be a rotatable key switch. Starting-control means comprise one or two user-input switches. When one starting-control switch is used it may be a rotatable ignition switch which combines starting-control and control-energy connection functions. The control means and power-regulation means may comprise any combination capable of providing the required control and regulation functions that include reading code-signals, determining whether such code-signals comply with pre-defined authorization code requirements, regulating starter-motor operation to operate whenever starting is initiated, and regulating engagement to only engage after the control means has determined that pre-defined authorization code requirements are met. Engagement means may be any device capable of the regulation of transfer of starting-work including mechanical means moveable into or out of contact such as a friction clutch or pair of gears, or valve-controlled pneumatic or hydraulic means.

Shielded enclosure 40 within an enclosing-component has general utility for protecting enclosed parts, such as mechanical and electrical components, from external environmental hazards, manipulation by unauthorized persons, and internal environmental hazards. Furthermore, the enclosing-component and enclosed use-control means parts are selected to prevent manipulation of use-control means as a feasible method of by-passing such use-control means. The enclosing-component could be any component of the machine such as the solenoid component, engine, or starter-motor as long as enclosed parts are shielded from external and internal hazards and protected from unauthorized manipulation, and have protected access to regulate power in order to enable control and coordination of engagement and starter-motor operation.

Figure 2:
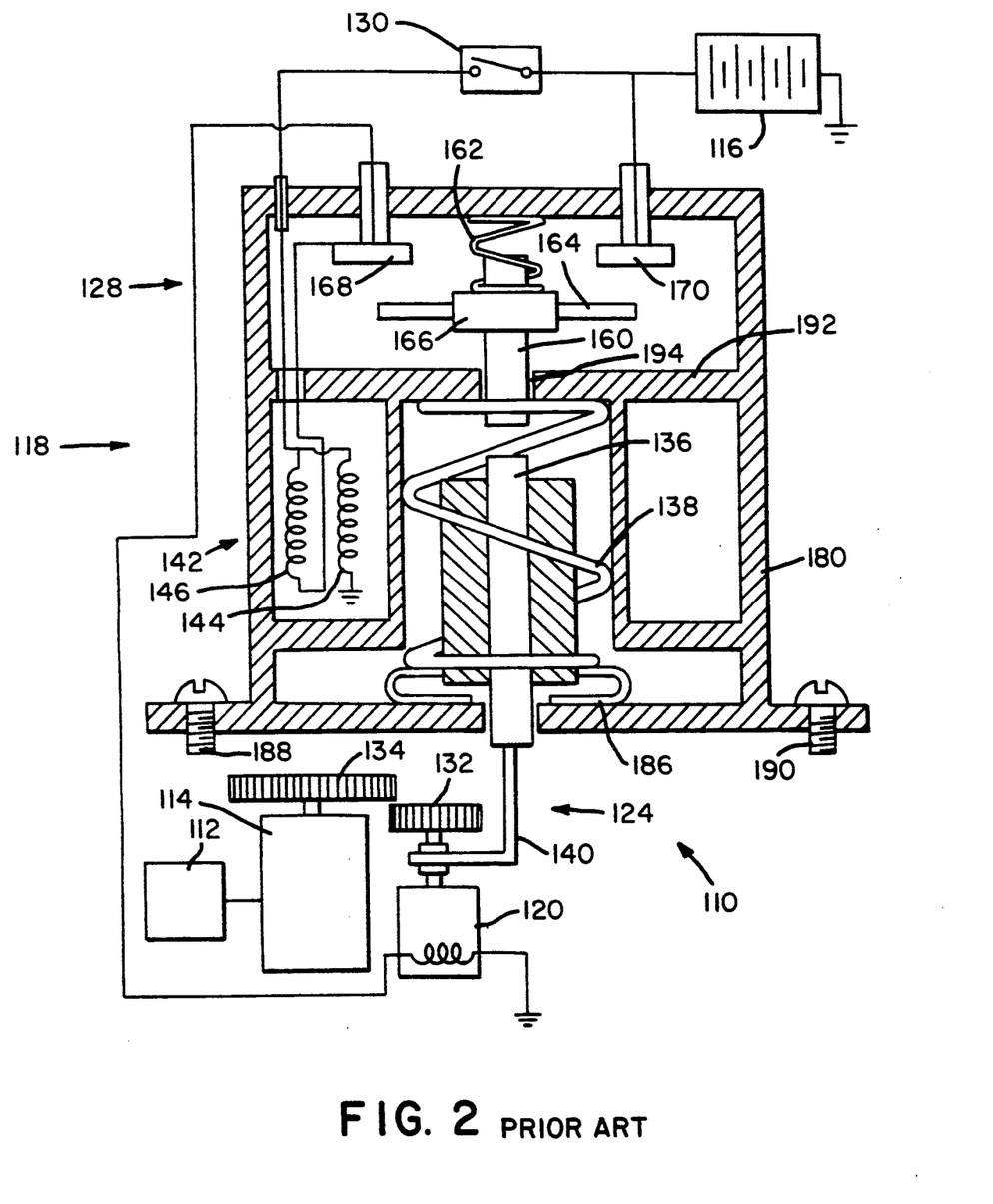
FIG. 2, a schematic view, partially in cross-section, illustrates an example prior art machine for comparison.

In FIG. 2, a prior art automobile 110 comprises a gasoline tank 112 connected to a piston engine 114 for converting the gasoline into vehicle movement for land transportation. Battery 116 is connectable through solenoid component 118 to regulate the flow of electricity to energize starter-motor 120 which converts the starting-energy to starting-work. Battery 116 is also connectable through cylindrical solenoid component 118 to regulate the flow of electricity for energizing engagement means 124 which regulate the transfer of starting-work from starter-motor 120 to engine 114 to increase the speed of the engine to a minimum starting speed to start the engine. Battery 116 also supplies control-energy for solenoid component 118 which contains a controller-switch 128 that communicates with a rotatable starter-switch 130 which the user turns in a first direction to initiate a starting-sequence and releases, allowing it to spring back in an opposite second direction to terminate the starting-sequence.

Engagement means 124 includes an engager 132—a gear that communicates with starter-motor 114 and is moveable to communicate with a second gear 134 that communicates with engine 114 to transfer starting-work from the starter-motor to the engine. The engager is moveable into a position-for-starting in which the two gears 132,134 mesh to transfer starting-work produced by the starter-motor 120 to the engine 116 for starting the engine; and movable out of position-for-starting, as shown, enabling the engine to operate without communicating with starter-motor 120. If such gears are moved together while the starter-motor is operating the gears will not mesh and may be damaged. Therefore, the controller-switch 128 of the solenoid component 118 controls the flow of electricity to starter-motor 120 to coordinate starter-motor operation with completion of engagement required to prevent such damage. Spring 138 is a means to generate force which prevents the engager from moving into position-for-starting until both coils are energized to cooperate in generating sufficient magnetic field strength for the core of engagement plunger 136 to generate sufficient forces and movement to overcome the force generated by spring 138 such that force and movement are transferred to engager 132 by engagement linkage 140 to move the engager into position-for-starting.

The user initiates the starting sequence by activating starter-switch 130 which directly energizes holding coils 144 and pulling-coils 146 of engagement coils 142 which generate a magnetic field to move the engagement core of the engagement plunger 136 toward the center of the engagement coils. The engagement plunger communicates with the engager such that when the engager is in position-for-starting the position of the engagement plunger indicates that the engager is in position-for-starting.

One end of switch shaft 160 is an engagement sensor positioned to detect engagement. As the engagement plunger moves the engager into position-for-starting the engagement plunger also pushes against the engagement sensor of switch shaft 160 overcoming the force of spring 162 to move switch shaft 160 into a position indicating that the engager is in position-for-starting. Switch conductor 164 is mounted on switch shaft 160 by insulator 166 such that when the switch shaft is in a position indicating that the engager is in position-for-starting, the switch conductor is also in position-for-starting in which it connects between starter-contacts 168 and 170 which energizes starter-motor 120, and which de-energizes pulling-coils 146.

Energizing both holding coils 144 and pulling-coils 146 is required to generate a sufficient magnetic field to move the engagement plunger into position-for-starting; but once position-for-starting is achieved, energizing only holding coils 144 generates sufficient field strength to overcome force generated by springs 138 and 162 to maintain engager 132 and switch conductor 164 in position-for-starting. Therefore, once position-for-starting is achieved, pulling-coils 140 are deenergized to reduce starting-energy requirements and the holding coils remain energized until starter-switch 130 is released to terminate the starting-sequence.

Solenoid component 118 comprises enclosing-shell 180 that encloses the components of the solenoid component to protect them from external environmental hazards such as water, dirt, oil, rocks, loose wires, falling tools that might damage or prevent movement of enclosed components. Flexible diaphragm 186 prevents contaminants from entering the solenoid component through the aperture for engagement linkage 140. The enclosing-shell is connected to the starter-motor by stove-bolts 188,190. Wall 192 separates the solenoid component into two sections. An engagement section which contains engagement coils 142 and engagement plunger 136; and a switch section contains switch conductor 164 and starter-contacts 168,170. The wall also provides bearing 194 which is a slideway to provide restraint in all lateral directions to the switch shaft to restrict switch shaft motion to only move axially.

Figures 3, 4:
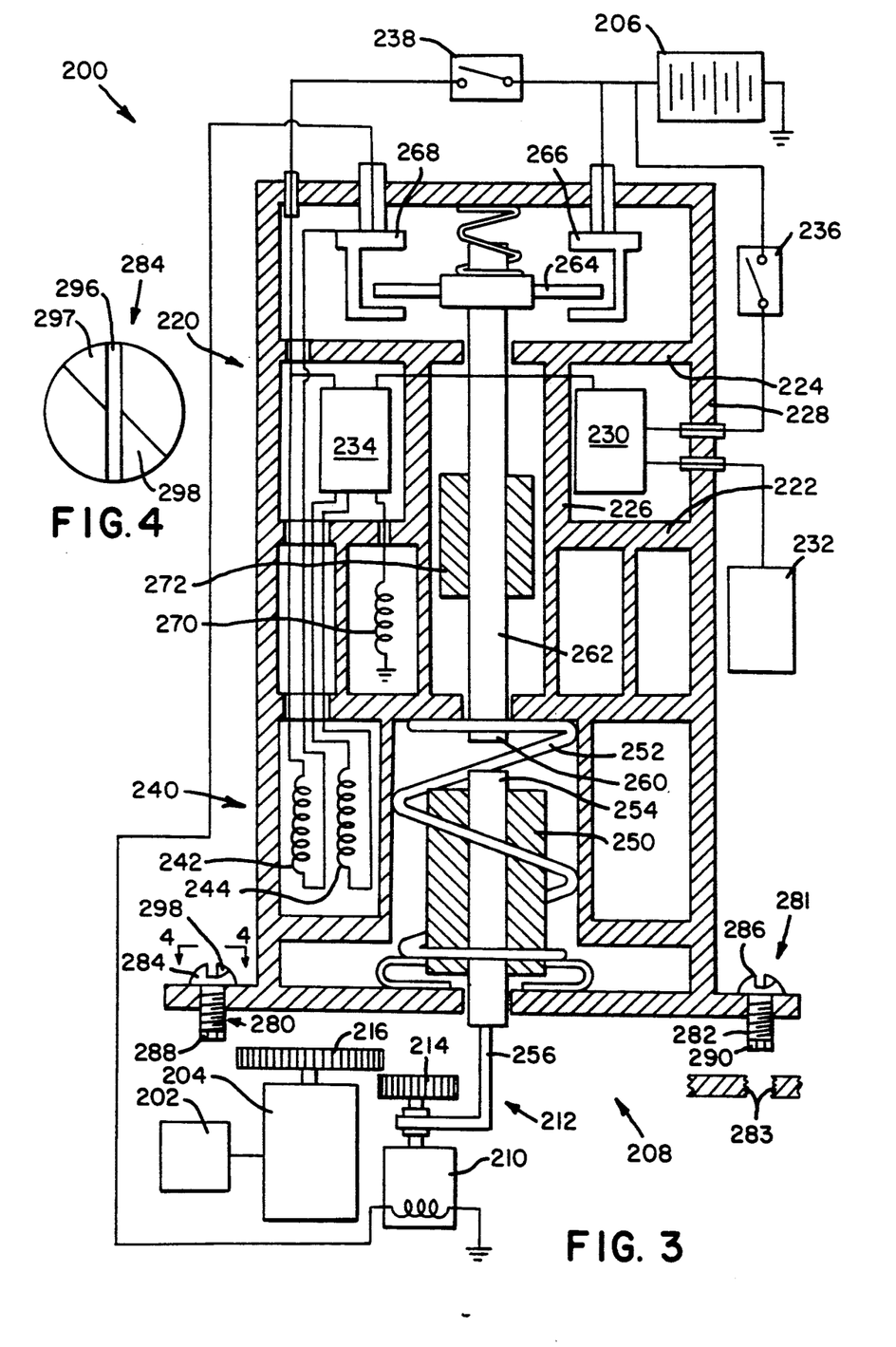
FIG. 3, a schematic view partially in cross-section presents a preferred embodiment of the machine of the invention.
FIG. 4, a plan view, illustrates the one-way stove-bolt head of the invention.

In FIG. 3, a preferred embodiment of the machine 200 of the invention, includes a source of combustible fluid fuel 202 connected to an internal combustion engine 204 and a starting-system to start the engine A single battery 206 provides a single source for engagement, control, and starting-energy. A solenoid component 208 shown as a cylindrical section contains control means and power-regulation means to control and regulate the flow of electricity to starter-motor 210 and to engagement means 212 including an engager 214, a gear, communicating with the starter-motor, and which is moveable to mesh with a second gear 216 communicating with the engine to transfer starting-work from the starter-motor to the engine to increase the speed of the engine to a minimum starting speed to start the engine.

In the preferred embodiment the enclosing-component is solenoid component 208 that contains shielded enclosure 220 which is surrounded by metal walls that form a barrier to protect enclosed parts of use-control means from internal and external environmental hazards and to prevent manipulation by unauthorized persons. Such parts are longitudinally enclosed between walls 222,224 and radially enclosed between wall 226 and enclosing-shell 228.

Additional parts have been included in the machine of the invention to provide use-control means to prevent an unauthorized person from starting engine 204; and to provide anti-bypass means to prevent an unauthorized person from bypassing use-control means. Use-control means include controller 230, code-input means 232, and power regulator 234. The controller is connected to battery 206 through source switch 236 to enable the user to de-energize the controller when the machine is not in use and to enable resetting the controller as described later. Code-input means 232 comprises a keyboard containing multiple push-button momentary-contact input-switches, typical of keyboards, to allow sequential entry of an authorization code by the user. Code-input means are connected to the controller for user-input of an authorization code and transmission of code-signals to the controller. Code-signals that match pre-defined authorization code requirements must be received by the controller before the controller will generate control-signals to enable the engine to start. Controller 230 is connected to provide control-signals to power regulator 234 to regulate flow of electricity to starter-motor 210 and engagement means 212.

Electricity flows from battery 206 to power regulator 214 through starter-switch 238 to enable a user to initiate a starting-sequence to be performed by the use-control means. Engagement energy flows from the power regulator to engagement coils 240 to control engagement. Pulling-coils 242 are controlled directly by the starter-switch such that whenever the starter-switch is first activated, electricity flows through the pulling-coils. However, the pulling-coils acting alone do not generate a magnetic field sufficiently strong to move engager 214 into position-for-starting.

When code-signals that comply with pre-defined authorization code requirements have been received by controller 230 and the user initiates the starting-sequence by activating starter-switch 238, the controller outputs control-signals to power regulator 234 in order to energize holding coils 244. Engagement energy flows from battery 206 through starter-switch 238 through the pulling-coils 242 and also through the power regulator and through the holding coils; the resulting magnetic field of the cooperating coils 242,244 provide a high strength magnetic field that communicates with the engagement core 250 to provide a sufficient force to overcome means to generate force 252—a spring to move engagement plunger 254 upward to transfer such movement through engagement linkage 256 to move engager 214 into position-for-starting; and move the engagement plunger up against one end of switch shaft 262 which acts as a detecting-sensor 260 to determine whether the engager is in position-for-starting and respond by moving the switch shaft such that when the engager is in position-for-starting the switch conductor 264 is in position-for-starting to connect between starter-contacts 266,268 to conduct starting-energy to energize starter-motor 210.

Conversely, when code-signals that comply with such requirements have not been received, and the user initiates the starting-sequence, controller 230 signals power regulator 232 to provide solenoid-energizing current to switch coils 270, and to provide solenoid-energizing current to holding coils 244 in a direction opposite to the direction provided when code-signals comply with such requirements. Control-energy flows from battery 206 through the starter-switch and directly to the pulling-coils 242 and also through the power regulator and through holding coils 270. The electromagnetic effects of the two engagement coils cancel out to produce a lower strength magnetic field. Means to generate force 252 prevent the lower strength field from moving engager 214 into position-for-starting. Control-energy flows from battery 206 through the power regulator and through switch coils 270. The magnetic field generated by switch coils moves switch core 272 mounted on switch shaft 262 such that switch conductor 264 connects between contacts 266,268 to energize starter-motor 210 and de-energize pulling-coils 242. The starter-motor operates without moving engager 214 into position-for-starting; therefore the engine doesn't start, but sounds like normal starting.

The enclosing-component of the invention is connected to the machine using one-way fasteners 280,281 to prevent replacing the enclosing-component of the invention with a conventional component thus preventing an unauthorized person from bypassing the use-control means by such replacement. Each fastener typically includes external treads 282 which engage the internal threads 283 of a part of the machine such as the starter-motor. The fasteners have one-way heads 284,286 at the front-end of the bolts which enable installation from the front-end using hand tools, but which prevent removal from the front-end without drilling or grinding.

In the novel one-way fasteners of the invention back-ends 288,290 are configured to enable easy removal by hand tools from the back-end once access to back-ends 296,298 is obtained. The enclosing-component is mounted such that some other component of the machine must be removed before access to back-ends 288,290 can be obtained.

In a specific embodiment, the fasteners are one-way stove-bolts with one-way heads that can be installed using the blade of a screwdriver, and the back-ends 288,290 have hex-shaped tips to enable attachment with a crescent wrench. Alternatively the back-ends could be configured with a hex-shaped hole for attachment with an allen wrench. The solenoid component is mounted on the starter-motor and the starter-motor must be removed from the engine to access the back-ends of the bolts.

FIG. 4 illustrates the preferred one-way head 284 comprising diametrical slot 296 for engagement with the flat blade of a conventional screwdriver to turn the head clockwise to install the bolt. Angled sections 297,298 are surfaces which angle between the bottom surface of slot 296 and the semi-circular periphery of the head to prevent removal using a screwdriver from the front-end 284.

The shielded enclosure could be located in another area of the solenoid component, such as above the switch section or below engagement coils 208. Source switch 236 and starter-switch 238 are shown as separate switches, but could be one switch as commonly provided in automobiles. Starter-contacts 266,268 are shown configured to enable contact if switch-windings 270 pulls the switch core 272 toward the engagement section. However, the contacts could simply be flat plates if the switch-windings and switch core were configured to move the switch core away from the engagement section.

Advantages of the preferred embodiment include that the solenoid component provides a convenient location for a shielded enclosure containing parts of the use-control means because energy flow to both the engagement means and starter-motor can be conveniently accessed for regulation from within the solenoid component, and manipulation by an unauthorized person thus prevented.

The preferred embodiment of the use-control means consists essentially of a keyboard, a connecting cable and the solenoid component of the invention which is installed in a manner similar to conventional solenoid components. A skilled mechanic can install the use-control means of the invention in a few minutes. If a component of the use-control means fails and replacement parts are not available, the solenoid component can be temporarily replaced by a conventional solenoid component. Replacing the solenoid component of the invention requires removal of the starting motor, removal of the solenoid component of the invention, reinstalling the starter-motor, and installing a new solenoid component, which requires about an hour for a skilled mechanic with a lift and conventional tools of his trade. A user-input error does not disable the car, which could be dangerous, or sound an annoying siren which could be used by an unauthorized person to signal an incorrect authorized-code guess.

A shielded enclosure within the solenoid component has general utility for protecting enclosed parts such as mechanical and electrical components. The enclosing-shell is a sealed metal container to protect enclosed components from external environmental hazards such as water, dirt, oil, rocks, loose wires, falling tools. The enclosing-shell is constructed with welded or mechanically locking connections to provide that the solenoid component cannot be disassembled or enclosed parts manipulated without damaging the functioning of the solenoid component; thus the shielded enclosure provides a tamper-proof location for preventing manipulation of such enclosed parts by unauthorized persons. The shielded enclosure is surrounded by a metal barrier to protect enclosed parts from internal environmental hazards such as high magnetic fluxes generated by coils, and sparks generated when the switch conductor connects between starter-contacts.

In the preferred embodiment of the machine, bypassing the use-control means is not feasible because manipulation of engagement means is prevented. The enclosed parts of the use-control means have been selected such that there are no external connections which can be energized to move the engager into position-for-starting. No method of rewiring or disabling engine components can be used to bypass the use-control-system. The solenoid component is attached to the starter-motor such that engagement means are physically enclosed within the solenoid component, starter-motor and engine, preventing mechanical manipulation of engagement means to move the engager into position-for-starting. Replacement of the solenoid component is prevented by the one-way bolts of the invention. It is not feasible that an unauthorized person may have the time, tools, and skill required to remove the starter-motor, remove the solenoid component, replace with a conventional solenoid, and replace the starter-motor.

Furthermore, it is not feasible to guess the authorization code. There is no indication of incorrect code-input, and initiating a starting-sequence always results in starter-motor operation which sounds like normal starting regardless of incorrect authorization code input. The unauthorized person must test each guessed code by turning off the ignition switch, turning on the ignition switch, entering the code guess, initiating an engine starting-sequence and waiting to determine if the engine will start which requires a delay between guesses and drains the battery such that only a small number of guesses can be tried before the battery is drained. For a four-digit authorization code an average of five thousand guesses would be required in order to guess the proper code. It is common for internal combustion engines to require significant and unpredictable amount of starting time, thus an unauthorized person could never be certain that an attempted guess is incorrect; and even if the correct authorized-code is guessed, if the engine fails to start immediately then the unauthorized person may decide to try another guess before the engine starts.

Figure 5:
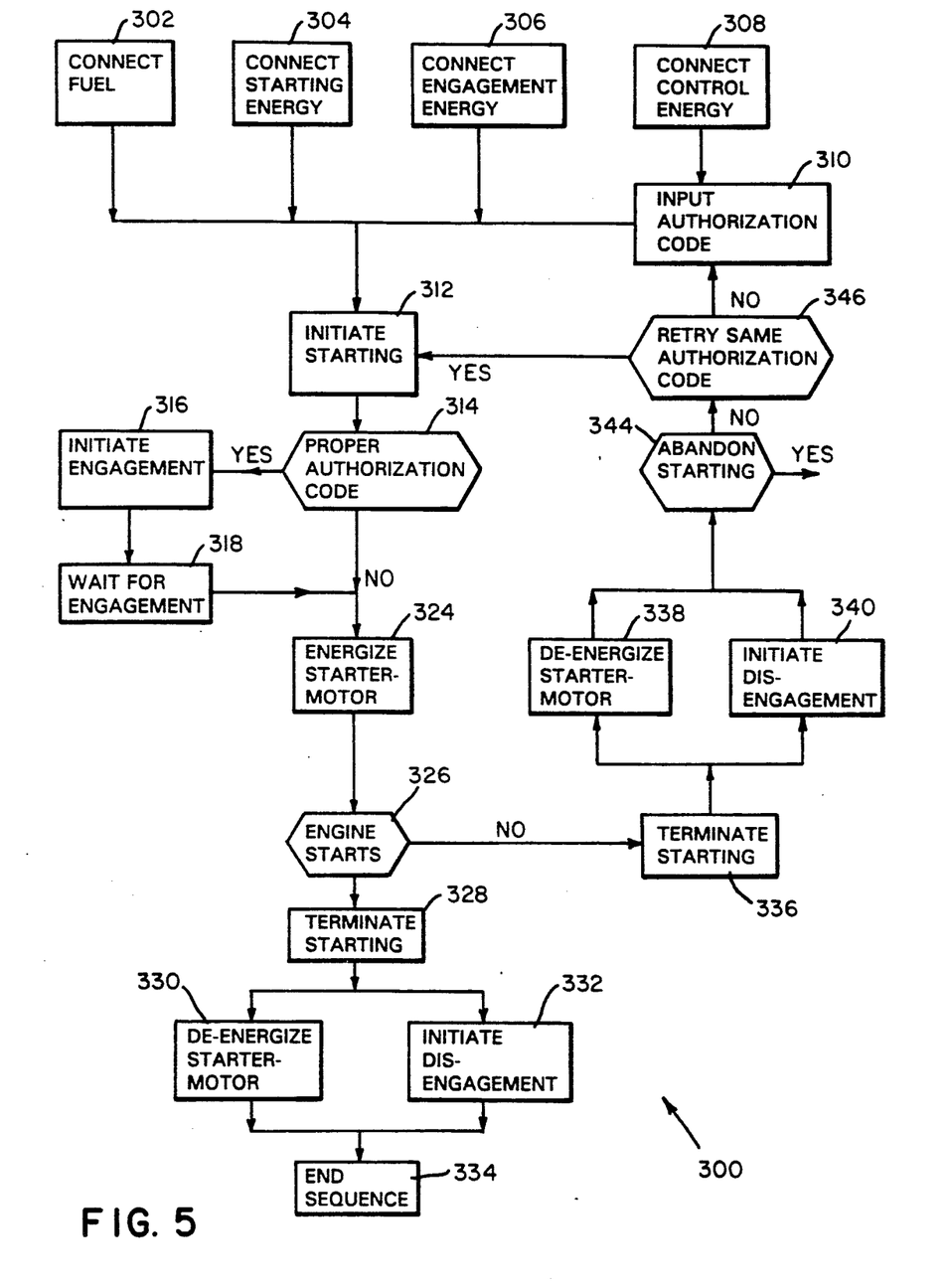
FIG. 5, a block diagram, presents a preferred method of operation of the invention, including the starting-sequence.

A diagram of preferred machine operation 300 of FIG. 5, illustrates that the engine must be connected to a source of combustible fluid fuel 302, a source of starting-energy 304, a source of engagement energy 306, and a source of control-energy 308. After control-energy is connected the user inputs an authorization code 310 into a code-input means which transmits code-signals to control means which determine whether code-signals comply with pre-defined authorization code requirements, and generate control-signals that enable starting only if such requirements are met. Then the user initiates starting 312.

The fuel may be any flowable combustible fluid, and sources of energy may be any controllable energy. The code-input means may be a keyboard containing multiple momentary-contact push-button code-input switches or a single code-input switch for inputting an authorization code in the form of timed pulses; and the starting-sequence can be initiated by correct number of input-code digits, or by a momentary-contact push-button switch on a keyboard or by a separate rotatable switch, etc.

If control means determine that authorization code requirements are met 314 and the user initiates starting, then control means initiates engagement 316 between the starter-motor and engine by signalling power-regulating-means to energize engagement means; and, then control means wait for engagement 318 to complete before continuing the starting-sequence.

Otherwise, if control means determine that authorization code requirements are not met 314, engagement is not initiated and the engine will not be able to start.

Engagement is communication between a starter-motor and the engine that enables transfer of starting-work from the starter-motor to the engine. Engagement means may be any means to regulate the transfer of work. Generally for mechanical engagement means, engagement must be completed before the starter-motor can be energized, but for hydraulic engagement waiting is not required. If not required, the wait for engagement 318 step may be eliminated.

Next, the starter-motor is energized 324 to convert starting-energy into starting-work. The starter-motor operates regardless of whether the required authorization code was received by control means and in the preferred embodiment of the machine does not provide any indication of authorization code input error or non-engagement except the failure of the engine to start, thus an unauthorized user cannot easily determine whether an authorization guess was correct. If the starter-motor is engaged, starting-work is transferred to the engine to increase the engine speed to a minimum starting speed to enable engine starting.

If the engine starts 326, starting is terminated 328 either automatically or by user-input; then the controller de-energizes the starter-motor 330 and initiates disengagement 332 of the starter-motor from the engine; and the starting-sequence ends 334.

Otherwise, if the engine does not start, the starting-sequence is terminated by the user 336; then the controller de-energizes the starter-motor 338 and initiates disengagement 340 of the starter-motor from the engine. The user can abandon starting 344; or the user can choose to retry the same authorization code 346 by re-initiating starting 312; or the user can re-input an authorization code 310 and then re-initiate starting 312.

Figure 6:
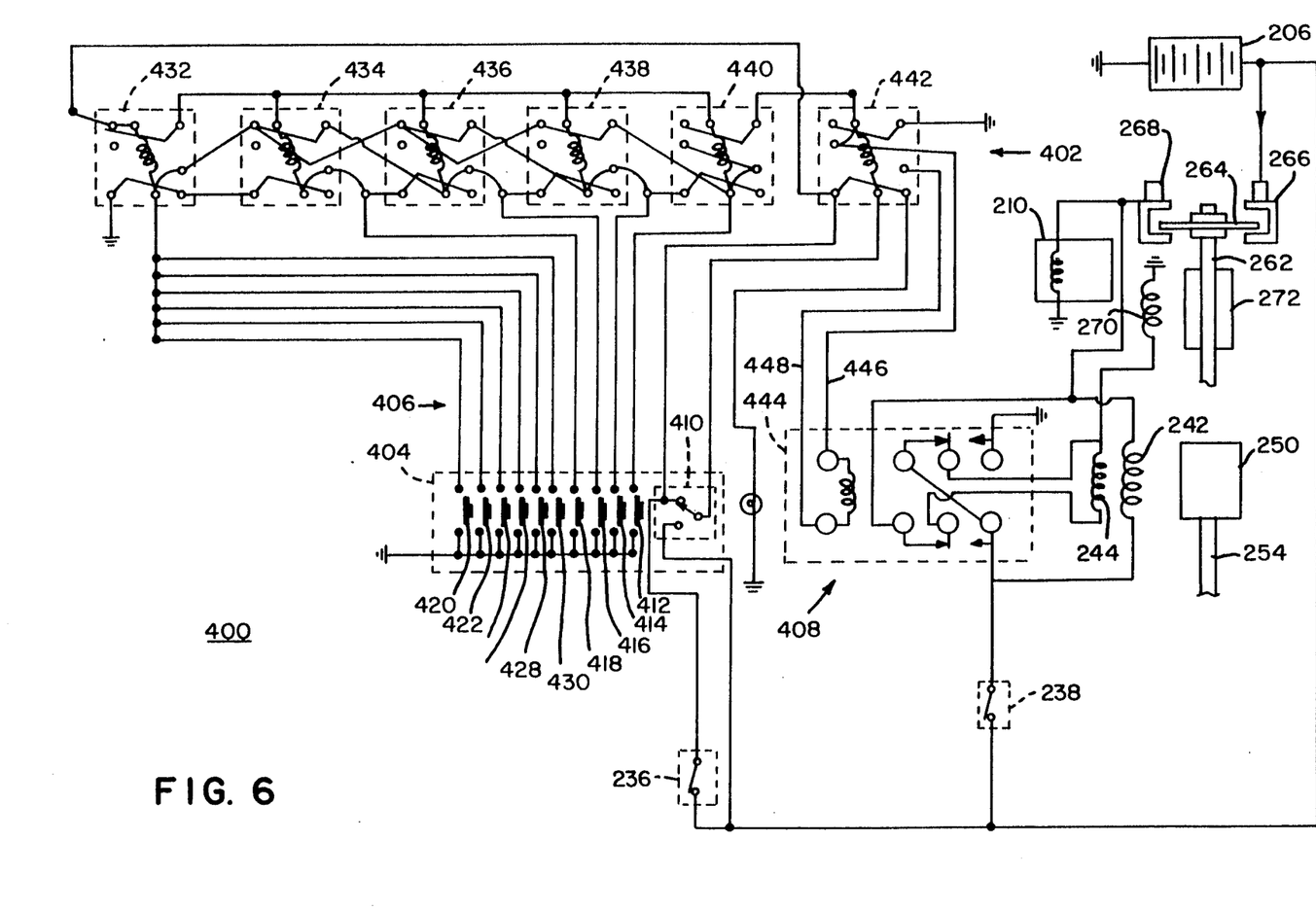
FIG. 6, an electrical schematic, presents a preferred embodiment of the use-control circuit.

In FIG. 6, the preferred embodiment of the use-control circuit 400 comprises a control-circuit and a power-regulation circuit. The control-circuit comprises: (a) controller 402 located within the shielded enclosure of the solenoid component, (b) user-input means which includes a source switch 236 connecting the source of control-energy 206 to controller 402, and (c) keyboard 404 connected by a cable of wires 406 to controller 402. The power-regulation circuit comprises: (a) power regulator 408 located within the shielded enclosure of the solenoid component and communicating with controller 402, (b) engagement solenoid including a high current pulling-coil 242, and a low current holding coil 244 to regulate engagement, (c) switch-solenoid 270 having one low current coil to position switch conductor 264 in relation to starter-contacts 266,268 to regulate flow of starting-energy from the source of starting-energy 206 to the starter-motor 210.

Keyboard 404 comprises valet switch 410, and ten code-input switches. Four of the code-input switches 412,414,416,418 are combination-switches that must be pressed in correct sequential order to transmit the authorization code before the engine will start. Pushing any other code-input switch 420,422,424,426, 428,430 locks the controller; as does pushing any combination-switch out of correct sequential order.

The number of code-input switches can be varied, but a sufficient number of combination-switches must be provided such that guessing the authorization code is not feasible.

Cable 406 comprises one wire for each code-input switch, and one wire for valet switch 410. The wires may be colored, but are not color-coded such that an unauthorized user can not determine which code-input switches are combination-switches or determine the authorization code from the color of the connected wire. The authorization code can be changed by rearranging the connections between the combination-switches and wires that connect to the combination-switches.

Controller 402 consists essentially of control-relays connected to perform required control functions, and comprising lock-relay 432, four combination-relays 434,436,438,440, and valet relay 442. Each combination-switch 412,414,416,418 of keyboard 404 is connected to one combination-relay, and each combination-relay is connected to one combination-switch, such that the combination-switches have to be activated to set the control-relays in correct sequential order or the lock-relay is activated (set) to lock the controller. Each code-input switch of keyboard 404 which is not a combination-switch is connected to activate the lock-relay. Activating lock-relay 432 locks the controller so that the controller will not accept an authorization code to enable engine starting. Turn source switch 236 off clears the lock-relay so that the controller will always permit authorization code entry when the supply switch is reactivated. After starting, the combination-relays may be cleared without affecting the operation of the machine.

The one-to-one correspondence between combination-switches and combination-relays could be modified and such parts connected so that simultaneous activation of certain combinations of combination-switches would be required to activate certain combination-relays, or the combination-relays could be connected such that combination-switches could be activated in any order; or combination-relays connected to require certain combination-switches to be activated repeatedly; but the preferred embodiment provides advantages such as a simple circuit and friendly user interface.

Valet switch 410 is connected to valet relay 442; the valet switch activates the valet relay only if all the combination-relays are activated. The valet switch is separately connected to battery 206 such that once activated, the valet relay remains activated until the valet switch is turned off, regardless of source switch 236 cycles or code-input switch activations. Thus, after a proper authorization code has been input the valet switch can be used to deactivate the use-control means to allow another person to temporarily use the system without revealing the authorization code to such person. Thus the need to change the authorization code after each such temporary use is eliminated.

When either all the combination-relays are activated or when the valet relay is activated then the controller outputs an enabling signal which is an On signal which enables regulator 408 to start the engine; otherwise the controller outputs a default-signal which is an Off signal which prevents engine starting.

Whenever the controller is de-energized and the valet relay is not activated, and then the source switch is activated to energize the controller then the controller begins to operate in a clear-state in which all the relays are clear. Whenever the controller is operating in a clear-state it outputs a default-signal to the power regulator which is an Off signal in which no current flows. Whenever the controller is operating in a clear-state and a combination-switch is activated in the correct sequential order, then the controller begins to operate in an input-signal and continues to output a default-signal. Whenever the controller is operating in an input-state and then the correct number of combination-switches are activated in the correct sequential order, then the controller begins to operate in an authorized state in which the controller outputs an enabling signal to the power regulator which is an On signal in which current flows to set the regulator-relay. Whenever the controller is operating in an authorized state and the valet switch is turned on then the valet relay is set, and the valet-function is activated and the controller will continue to operate in an authorized state regardless of changes in the source-switch or code-switch activations, until the valet switch is turned off. Whenever the valet-function is activated the controller will output an enabling signal when the starter switch is activated. Whenever the controller is operating in an input-state or a clear-state and a code-input switch is activated that is not in the correct sequential combination order, then the controller begins to operate in a locked state, and the controller will not accept authorization code input, or output an enabling signal until the supply switch is deactivated and then reactivated which results in clear-state operation.

Reset-means include that whenever the source switch is deactivated and then reactivated, the controller is reset to begin to operate in a clear-state.

Clear-relay 432, valet relay 442, and combination-relays 434,436,438,440 are double-pole double-throw miniature relays such as MAGNECRAFT W7PCK7's.

The use of a valet switch and a valet relay is an important contribution of the invention but they may be eliminated to reduce cost without interfering with other contributions.

Regulator 408 comprises regulator-relay 444 connected to controller 402 through conductors 446,448, such that when the controller is outputting an enabling signal to regulator 408 then the regulator-relay is set and if starter-switch 236 is activated (turned on) then solenoid-energizing current flows through both holding coils 244 and pulling-coils 242 such that they work together to move engagement core 250 into position-for-starting.

When the controller 402 is outputting a default-signal (no current) to regulator 408, regulator-relay 444 is clear; and if starting-switch 236 is activated then current flows in the reverse direction through holding coils 244 to reduce the magnetic field generated by pulling-coils 242 such that the engagement core does not move into position-for-starting. Furthermore, current flows through switch coils 270 to move switch core 272 into position to energize the starter-motor and de-energize the pulling-coils.

Regulator-relay 444 is a double-pole double-throw miniature relay such as MAGNECRAFT W76URCPCX34.

Advantages of the preferred use-control circuit include that delicate electronic parts (e.g. parts which would not be sufficiently reliable for commercial purposes within the environment of the circuit and shielded enclosure such as integrated circuits or transistors) are not required. When the valet function has been activated and source switch 236 is off only the valet relay remains active requiring only about one watt of power. The power regulator consists of only a single regulator-relay which may be a low-power relay because the high current through the pulling-coils of the engagement solenoid is not directly regulated.

The regulator is connected to the coils such that, unless the controller sets the regulator-relay, whenever the pulling-coil is energized the holding coil will be energized in such a way as to cancel the electromagnetic effect of the pulling-coil. Thus the machine can not be re-wired to electrically move the engager into position-for-starting.

Other use-control circuits could be substituted for the preferred circuit to perform the same control functions without interfering with other contributions of the machine of the invention. For example the controller could be modified to use an Integrated Circuit along with resistors, capacitors, etc., to reduce or eliminate the use of relays in the controller. Such a circuit might be cheaper in mass production, but may be less reliable or more expensive to manufacture in small numbers. Similarly, the preferred power regulator could be modified to use a higher power relay to directly control current through pulling-coils 242 instead of or in addition to directly controlling current through holding coils 244; such a high power regulator would be larger and more expensive than the preferred power regulator.

In the preferred embodiment, when controller 402 is outputting a default signal to power regulator 408 and the starter-switch is activated, then the current flowing through pulling-coils 242 is high enough to significantly drain the battery during each attempted start. Switch coils 270 and switch core 272 could be eliminated to reduce the cost of the use-control means. However, the starter-motor would make a significantly different sound than in normal starting thus allowing a knowledgeable user to confidently test authorization code guesses, thus reducing the effectiveness of the system.

In the preferred embodiment the user can not determine whether the use-control means is working properly or whether an incorrect authorization code has been input. Alternatively means could be provided to signal the user when the controller determines that a proper authorization code has been received. Such a signal would compromise the delay means of the preferred embodiment in which an unauthorized user must test each authorization code guess by initiating a starting sequence. Therefore another delay means to enforce a minimum time between authorization code inputs would be required to prevent using multiple guesses as a feasible means of unauthorized starting of the engine. Such alternative means to enforce a minimum time include (a) the user to turn the supply switch off to clear the controller between each code input, or (b) delaying output at such signal until a minimum time after each code input.

A means to signal the user could be for example a red light that is on when the controller is properly operating until a proper authorization code is received.

Figure 7:
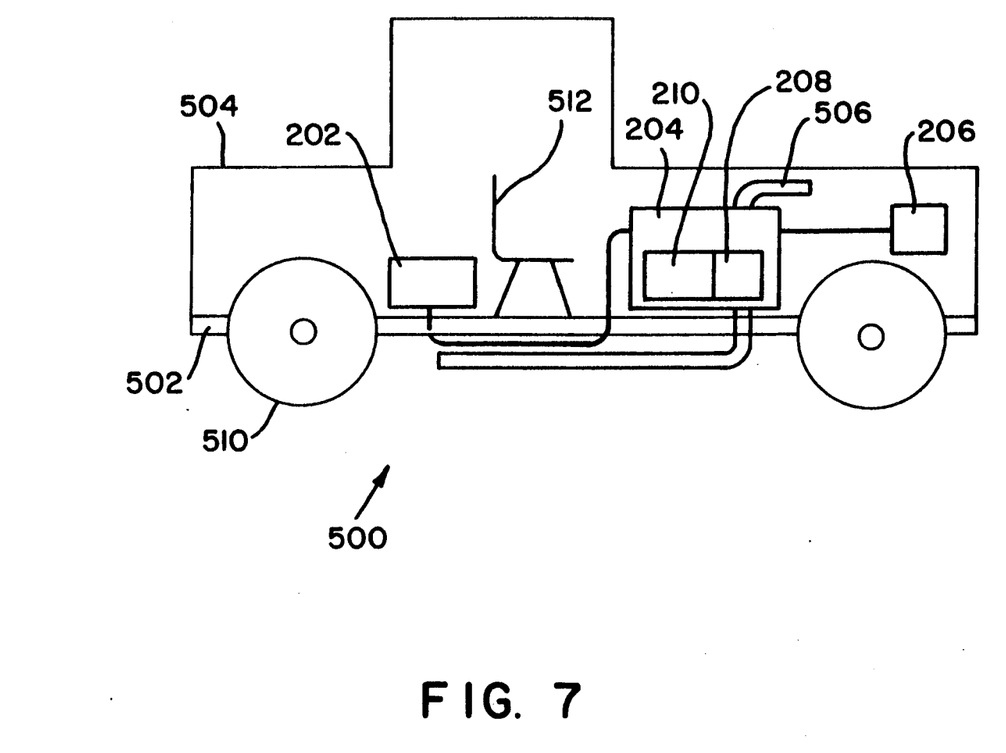
FIG. 7, a schematic view of an automobile or truck presents an example of a machine of the invention.

An example of a machine of the invention is a steerable motor vehicle for land transportation 500 of FIG. 7 such as a truck or car. Frame 502 and body 504 support and enclose components of vehicle 500. Fuel tank 202 is connected to engine 204 for converting combustible fluid fuel into work to move the vehicle. Battery 206 supplies starting-energy to starter-motor 210 and control-energy to solenoid component 208 of the invention. Engine 204 communicates with air intake system 506 which conducts air from an intake region of fresh air, and exhaust system 508 which delivers engine exhaust to a region remote from the air intake region. The machine includes wheels typical of 510 to support the vehicle, and which communicates with the engine to provide motion for the vehicle; and which often includes at least one seat for a passenger 512.

While the invention has been particularly illustrated and described with reference to preferred embodiments, it will be understood by those skilled in the art that changes in form and detail can depart from such embodiment without departing from the spirit and scope of the invention.

I claim:

1. A machine having an internal combustion engine and use-control means to prevent unauthorized starting of the engine in which such machine comprises:
   a source of combustible fluid fuel;
   an internal combustion engine connected to the source of fuel to convert the fuel into work;
   at least one source of energy to supply energy for starting the engine and supplying electrical energy for use-control;
   a starting-system to start the internal combustion engine which is connectable to the source of starting-energy, and which includes a starter-motor to convert starting-energy into starting-work which is controllably transferable to such engine in order to increase the engine speed to a minimum starting speed to start the engine;

a use-control means to prevent unauthorized starting of the engine; and which communicates with the starting-system; and which utilizes the control-energy to control starting of the engine; and which includes:

(a) code-input means for user-input of a multi-digit authorization code, and transmission of code-signals;

(b) control means to read inputs, and to determine whether inputs conform with predefined requirements, and depending upon such determination to respond by generating various outputs to enable engine starting only after the control means determine that code-signals conform to such predefined authorization code requirements; and (c) power-regulation means to respond to control-signals output from control means to regulate flow of energy, including starting-energy to operate the starter-motor and control-energy to control physical communication between the starter-motor and the engine; and anti-bypass means in communication with use-control means, to prevent an unauthorized person from defeating said use-control means and starting the engine; and comprising:

a tamper-proof enclosing-component which is constructed to prevent disassembly and which encloses use-control means parts to prevent unauthorized manipulation of such enclosed parts of use-control means; and said anti-bypass means having at least one one-way fastener of a type that is easily installed but not easily removed attaching said enclosing-component to the machine;

an in which the enclosing component and enclosed parts are selected to prevent bypassing use-control means as a feasible method for unauthorized starting of the engine.

2. The machine for claim 1 in which such machine is a steerable motor vehicle for transportation on land, and includes:

a fuel tank to provide a source of combustible fluid fuel for conversion by the engine into work to move such vehicle;

a battery to supply starting-energy for starting the engine and to supply control-energy for use-control means; and at least one seat for an occupant.

3. The machine of claim 1 in which, the tamper-proof enclosing-component of the machine includes a shielded enclosure surrounded by a barrier to protect enclosed parts of use-control means from internal environmental hazards.

4. The machine of claim 3 in which, the barrier of the shielded enclosure is a metal barrier that surrounds the shielded enclosure of the enclosing-component.

5. The machine of claim 1 in which, code-input means include a keyboard with multiple momentary-contact, push-button code-input switches to transmit code-signals of the authorization code from the keyboard to the control means.

6. The machine of claim 5 in which, an authorization code must be input by serial activation of various code-input switches of the keyboard before use-control means will enable the engine to start.

7. The machine of claim 1 in which, anti-bypass means include a minimum delay between code-signal receptions for each authorization code to prevent multiple guesses of the authorization code as a feasible method for unauthorized starting of the engine.

8. The machine of claim 1 in which, anti-bypass means include at least, one one-way fastener which is used to attach the enclosing-component in a fixed position to the machine at a first end of an aperture through part of the machine; and in which the fastener comprises:

a front-end configured to enable attachment of the enclosing-component to the machine utilizing the front-end configuration while accessing the fastener from the first side of the aperture; and to prevent removal from the first side after such attachment; and, a back-end, configured to enable removal of the enclosing-component from the machine utilizing the back-end configuration while accessing the fastener from a distal end of the aperture;

and in which, another component of the machine must be removed to achieve access to the distal end of the aperture in order to replace the enclosing-component in order to prevent replacement of the enclosing-component as a feasible method for unauthorized starting of the engine.

9. The machine of claim 1 in which, anti-bypass means include:

at least one one-way fastener to attach the enclosing-component in a fixed location to the machine; and means to install the enclosing-component while accessing the fastener only from the first end of the aperture, and without requiring access to a distal end of the aperture during such installation.

10. The machine of claim 1 in which, anti-bypass means include at least, one one-way fastener to attach the enclosing-component in a fixed position to the machine at the first end of an aperture through a part of the machine in which the aperture communicates with internally threaded means;

and in which each one-way fastener includes an one-way stove-bolt comprising:

an elongated, externally threaded shaft rotatable about its CLA to engage with internally threaded means in communication with the aperture to hold the enclosing component in fixed position relative to the aperture; and, which can be turned in one direction for attaching and in an opposite direction for removing;

a one-way circular head integral with a front-end of the shaft having a diametrical slot to enable using the blade of a screwdriver for turning the shaft with to engage the external threads of the shaft with the internal threads of the aperture for attaching the enclosing-component in a fixed position to the machine utilizing the head while accessing the head from the first end of the aperture and in which the sides of such slot include angled sections located to prevent using the blade of a screwdriver for turning the shaft in order to remove the enclosing-component while accessing the fastener from only the first end of the aperture;
and in which,
a back-end of the shaft is configured to enable using hand tools for turning the shaft in order to remove the enclosing-component utilizing the back-end of the shaft while accessing the distal end of the aperture.

11. The machine of claim 1 in which,
the starting-system to start the internal combustion engine further includes,
engagement means to regulate physical communication between the starter-motor and the engine; and in communication with use-control means to enable use-control means to control such regulation of physical communication;
and in which,
control means generate outputs to enable physical communication between the starter-motor and the engine only after receiving code-signals from code-input means that conform with predefined authorization code requirements; and prevent such physical communication before such predefined requirements are met.

12. The machine of claim 11 in which,
anti-bypass means to prevent an unauthorized person from defeating use-control means include means to prevent any indication of user-input error, except failure of the engine to start, which comprise operating the starter-motor whenever starting is initiated but activating engagement means to enable physical communication between the starter-motor and the engine only after control means read code-signals and determine that code-signals conform with predefined authorization code requirements, and in which starter-motor operation without physical communication prevents engine starting and sounds the same as starter-motor operation with physical communication, and in which there is no other indication of user-input error, in order to prevent multiple guesses of the authorization code as a feasible method for unauthorized starting of the engine.

13. The machine of claim 11 in which,
the starting system to start the internal combustion engine further includes,
a solenoid component to provide force and movement to activate engagement means to control physical communication between the starter-motor and the engine, and in which the solenoid component includes:
an enclosing-shell to protect enclosed components from external environmental hazards, and which is constructed to prevent disassembly to provide a tamper-proof enclosure to prevent unauthorized manipulation of enclosed components;
engagement coils within the enclosing-shell to provide a magnetic field, and in which control means generate control-signals to enable power-regulation means to regulate the flow of energy to engagement coils to regulate the magnetic field in order to enable such physical communication only after control means reads code-signals and determine that code-signals conform with predefined authorization code requirements, and in order to prevent such physical communication before such predefined requirements are met; and
an engagement plunger to provide force and movement transferred to activate engagement means in order to enable physical communication between the starter-motor and the engine, and which includes an integral engagement core of ferromagnetic material positioned within the magnetic field of engagement coils to communicate with engagement coils in order to generate such force and movement.

14. The machine of claim 11 in which,
engagement means to control physical communication between the starter-motor and the engine include:
an engager for regulating transfer of starting-work from the starter-motor to the engine and (a) moveable into position-for-starting in order to enable transfer of starting-work from the starter-motor to the engine so as to increase the engine speed to a minimum starting speed to start the engine; and (b) moveable out of position-for-starting to enable the starter-motor to operate without transferring starting-work to the engine, and to enable the engine to operate without being in communication with the starter-motor;
an engagement linkage to transfer force and movement to the engager in order to move the engager into and out of position-for-starting;
an engagement plunger to provide force and movement transferred through the engagement linkage to the engager in order to move the engager into and out of position-for-starting; and in which an engagement core of ferromagnetic material is integral with the engagement plunger; and,
engagement coils to provide a magnetic field to communicate with the engagement core to generate force and movement for the engagement plunger to transfer such force and movement through the engagement linkage to the engager in order to move the engager into and out of position-for-starting; and in which control means generate control-signal to enable power-regulation means to regulate the flow of energy through the engagement coils to enable physical communication only after control means receive code-signals that conform with predefined authorization code requirements, and prevent such physical communication before such predefined requirements are met.

15. The machine of claim 13 in which:
the tamper-proof enclosing-component, selected to enclose parts of use-control means in order to prevent unauthorized manipulation, comprises the solenoid component;
the enclosed parts of use-control means, selected to prevent bypassing use-control means as a feasible method of unauthorized starting of the engine, comprise control means and power-regulation means of use-control means which are enclosed within the solenoid component;
there are no external connections which can be directly energized to manually activate engagement means without knowing the authorization code;
the solenoid component includes means to connect a signal cable for code-signals from code-input means to control means positioned within the solenoid component, such signal cable being routed through the enclosing-shell of the solenoid component;

such means to connect a signal cable maintains the protective and tamper-proof qualities of the solenoid component; and the solenoid component, starter-motor, and internal combustion engine are arranged adjacently to enclose engagement means to prevent mechanical manipulation of engagement means as a feasible method for unauthorized starting of the engine.

16. The machine of claim 13 in which, the starting-system includes:

an engagement sensor to detect communication between the starter-motor and the engine, and to signal such detection; and which is enclosed within the solenoid component, and communicates with the control means;

and in which, after receiving code-signals that conform with predefined authorization code requirements control means first signal the power-regulation means to energize engagement coils to activate engagement means, and then control means wait for an input signal from the engagement sensor before signaling power-regulation means to energize the starter-motor.

17. The machine of claim 13 in which, the solenoid component is attached to the engine utilizing at least one one-way fastener of the type which can be easily installed but not removed in order to prevent replacement of the solenoid component as a feasible means for unauthorized starting of the engine.

18. The machine of claim 13 in which, at least one one-way fastener is used to is attach the solenoid component in a fixed position to the exterior of the starter-motor at an aperture through an enclosing wall that defines the exterior of the starter-motor; and in which the fastener comprises:

a front-end, configured to enable attachment of the solenoid component to the starter-motor, utilizing the front-end configuration while accessing the fastener from the exterior of the starter-motor enclosure; and to prevent removal from the exterior of the starter-motor after such attachment;

a back-end, configured to enable removal of the solenoid component utilizing the back-end configuration, while accessing the fastener from the interior of the starter-motor enclosure;

and in which, removal of the starter-motor is necessary to achieve access to the interior of the starter-motor enclosure in order to utilize the back-end for removal of the solenoid component in order to prevent replacement of the solenoid component as a feasible means for unauthorized starting of the engine.

19. The machine of claim 13 in which, at least one one-way fastener is used to attach the solenoid component in a fixed position to the starter-motor at an internally threaded aperture through an enclosing wall that defines the exterior of the starter-motor, and in which each one-way fastener includes an one-way stove-bolt comprising:

an elongated, externally threaded shaft rotatable about its CLA to engage with the internal threads of the aperture to hold the solenoid component in fixed position relative to the aperture; and which can be turned in one direction for attaching, and in an opposite direction for removing;

a one-way circular head integral with a front-end of the shaft having a diametrical slot to enable using the blade of a screwdriver for turning the shaft to engage the external threads of the shaft with the internal threads of the aperture for attaching the solenoid component in a fixed position to the starter-motor utilizing the head while accessing the head from the exterior of the starter-motor without requiring access to the interior of the starter-motor during such installation, and in which the sides of such slot include angled sections located to prevent using the blade of a screwdriver for turning the shaft in order to remove the solenoid component while accessing the fastener from only the exterior of the starter-motor;

and in which, a back-end of the shaft is configured to enable using hand tools for turning the shaft in order to remove the solenoid component from the starter-motor utilizing the back end of the shaft while accessing the interior of the starter-motor; and the starter-motor must be removed from the engine in order to achieve access to the interior of the starter-motor to utilize the back-end of the shaft to replace the solenoid component in order to prevent replacement of the solenoid component as a feasible method of starting the engine without authorization.

20. The machine of claim 1 in which:

such code-input means include a multiple of code-input switches for user-input of an authorization code, and for transmission of code-signals;

such control means consist essentially of a multiple of control-relays;

such use-control means further include reset-means to reset such control means to a clear-state to reinitiate the process of reading code-signals, and determining whether such signals conform with predefined requirements;

such source of control-energy is connectable to energize control means for such reading, determination, and responding;

the code-input switches include combination-switches for entering the correct authorization code, and in which the multiple control-relays include combination-relays to determine if code-signals conform with predefined authorization code requirements, and in which such combination-switches and combination-relays are connected such that, each combination-relay communicates with one combination-switch, and each combination-switch communicates with one combination-relay;

the determination whether code-signals conform with predefined requirements includes connecting such control-relays to: (a) operate in a clear-state after control means is not energized and then becomes energized; and operate in a clear-state after reset means are activated; (b) operate in an input state when control means is operating in a clear-state and then code-input switches are activated in a correct predefined sequential order; (c) operate in an authorized state when control means is operating in an input-state and then a predefined number of code-input switches are activated in a predefined sequential order; and the generated control-signals that depend upon such determination include (a) a default-signal generated when control means is operating in a clear-state, and when control means is operating in an input-state, and (b) an enabling signal generated when control means is operating in an authorized state.

21. The machine of claim 20 in which reset-means include,
a supply switch to control connection between source of control-energy and the control means; and which, when disconnected, and then reconnected resets such control means to operate in a clear-state;
and in which:
the multiple control-relays include a lock relay which when set, locks such control means to prevent control means from outputting an enabling signal in order to require that such control means be reset prior to initiating a valid entry of an authorization code for starting the engine;
any code-input switch that is not a combination-switch is connected to control means so as to activate the lock-relay;
combination switches are connected to control means so as to activate the lock-relay when any control switch is activated out of correct sequential order;
the multiple control relays include a valet-relay, and one input-switch is a valet switch which is a state on/off switch, connected to control means to enable setting such valet relay only when control means is in an authorized state, to maintain control means in an authorized state until the valet switch is turned off, regardless of supply switch activation; and
all code-input switches are momentary-contact, pushbutton switches.

22. A method of operating a machine in which such machine includes: starting-sequence initiating means; internal combustion-engine; starter-motor; engagement means; use-control means including control means, power-regulation means, and code-input means; and in which such operating method comprises the steps of:
selecting a component of such machine for tamper-proof enclosure of parts of such use-control means;
selecting control means and power-regulation means parts and enclosing such parts in such selected enclosing component in order to prevent the feasibility of manipulating such parts for bypassing such use-control means for unauthorized starting of the engine;
supplying a combustible fluid fuel to an internal combustion engine to convert such fuel into work;
supplying electrical control-energy to use-control means that controls flow of starting-energy from a source of starting-energy to a starter-motor, and controls communication between the starter-motor and the engine (a) to enable the starter-motor to operate in physical communication with the engine to transfer starting-work to the engine to start the engine, and (b) to enable the engine to operate without physical communication with the starter-motor;
providing a source of starting-energy controllably connectable to the starter-motor to convert such energy to starting-work;
inputting an authorization code into code-input means that transmit code-signals to control means which (a) enable physical communication between the starter-motor and the engine after code-signals that conform with predefined authorization code requirements are received, and (b) prevent such communication before code-signals that conform with such requirements are received;
initiating a starting-sequence which signals use-control means to perform the following steps if code-signals that conform with predefined authorization code requirements have been received:
(a) initiating physical communication between starter-motor and the engine in order to enable the transfer of starting-work to the engine to increase the engine speed to a minimum starting speed to start the engine;
(b) supplying starting-energy to the starter-motor which converts the starting-energy into starting-work which is transferred to the engine to increase the engine speed to a minimum starting speed to start the engine; and
terminating the starting-sequence which signals use-control means to perform the steps of (a) terminating the supply of starting-energy to the starter-motor, and (b) terminating physical communication between the starter-motor and the engine, if such communication has been initiated.

23. The method of operation of claim 22 in which,
engagement means could be damaged by operating the starter-motor during the engagement of physical communication between the starter-motor and the engine;
and such method of operation includes the additional step of,
waiting for the completion of physical communication between the starter-motor and engine before supplying starting-energy to the starter-motor.

24. The method of operation of claim 22 in which,
after initiation of the starting sequence use-control means initiate physical communication between the starter-motor and the engine, if code-signals that conform with predefined authorization code requirements have been received by control means; and
after initiation or the starting sequence use-control means always supply starting-energy to the starter-motor regardless of code-signals, to sound like normal starting so as to prevent any indication to the user that normal starting will not occur to enforce a minimum delay between authorization code guesses in order to prevent guessing as a feasible method for unauthorized starting of the engine.

25. The method of operation of claim 22 including the additional step of,
deactivating and then reactivating a supply switch before each authorization code input for preparing control means to receive code-signals and to determine if code signals meet predefined authorization code requirements.

26. The method of operation of claim 22 in which,
inputting an authorization code is performed by serial activation of multiple code-input switches positioned on a keyboard.

27. The method of operation of claim 22 in which,
inputting a predefined number of authorization code digits automatically initiates the starting-sequence, and engine starting automatically terminates the starting-sequence.

28. The method of operation of claim 22 in which,
the source of starting-energy and source of control-energy is a battery;
the machine includes a rotatable starter-switch to control initiation and termination of the starting-sequence; and which is also a supply switch to control the flow of electricity from the source of control-energy to control means; and which can be turned in a first direction and in an opposite second direction;

and in which such method of operation further comprises the steps of:

turning the starter-switch in a first direction to connect the source of electrical control-energy;

turning the starter-switch further in the first direction to initiate the starting-sequence;

releasing the starter-switch to allow it to turn in an opposite second direction in order to terminate the starting-sequence; and turning the starter-switch further in the second direction to disconnect the source of electrical control-energy.

29. A steerable motor vehicle for land transportation having an internal combustion engine and use-control means to prevent unauthorized starting of the engine and anti-bypass means to prevent bypassing use control means as a feasible method for unauthorized starting of the engine, in which such vehicle comprises:

a fuel tank containing combustible fluid fuel;

an internal combustion engine connected to the fuel tank to convert the fuel into work;

a battery to supply starting-energy and control-energy;

a starter-motor to convert electricity into starting-work, and which controllably communicates with the engine to regulate transfer of starting-work to the engine in order to increase the engine speed to a minimum starting speed to start the engine;

an engager for regulating transfer of starting-work from the starter-motor to the engine and (a) moveable into position-for-starting in order to enable transfer of starting-work from the starter-motor to the engine so as to increase the engine speed to a minimum starting speed to start the engine; and (b) moveable out of position-for-starting to enable the starter-motor to operate without transferring starting-work to the engine, and to enable the engine to operate without communicating with the starter-motor;

an engagement linkage to transfer force and movement to the engager in order to move the engager into and out of position-for-starting;

an engagement plunger to provide force and movement transferred by the engagement linkage to move the engager into and out of position-for-starting; and which includes an integral engagement core of ferromagnetic material;

engagement coils to provide a magnetic field to communicate with the engagement core to generate force and movement for the engagement plunger to transfer such force and movement through the engagement linkage to the engager in order to move the engager into and out of position-for-starting, and in which the intensity of the magnetic field can be regulated by controlling flow of electricity through engagement coils to control movement of the engager;

a keyboard comprising multiple momentary-contact, push-button code-input switches for user-input of an authorization code by sequential switch activations, and for transmission of code-signals;

a controller to read input-signals, and to determine whether input-signals conform with predefined requirements, and depending upon such determination to respond by generating various control-signals, including signals to control starting of the engine, and in which such input-signals include code-signals generated and transmitted by user-input of a multi-digit authorization code by sequential activations of code-input switches on the keyboard; and in which generated control-signals include signals to enable the engine to start, which are only transmitted after receiving code-signals that conform with predefined authorization code requirements;

a power regulator communicating with the controller to respond to control-signals from the controller (a) to regulate flow of control-energy in order to regulate starting-energy flow to enable control of starter-motor operation, and (b) to regulate control-energy flow through engagement coils to enable control of engagement;

two starter-contacts one connected to the battery, and the other connected to the starter-motor, and which are positioned for connection to conduct electricity from the battery to the starter-motor;

a switch conductor to regulate flow of electricity from the battery to the starter-motor, and movable (a) into a position to connect the starter-contacts in order to conduct electricity from the battery to the starter-motor, and (b) out of such connecting position to prevent such conduction;

a switch shaft in fixed physical relationship with the switch conductor, and supported in all lateral directions to enable the switch shaft to move the switch conductor into and out of position to connect between the two starter-contacts to regulate flow of electricity from the battery to the starter-motor; and having one end in physical communication with the engagement plunger to move the switch shaft in order to move the switch conductor into a position to connect between the two starter-contacts when the engagement plunger moves to a position indicating that the engager is in position-for-starting; and having an integral switch core of ferromagnetic material positioned within a magnetic field to provide force and movement for the switch shaft in order to position the switch conductor to connect between the two starter-contacts without moving the engager into position-for-starting in order to enable starter-motor operation to sound like normal starting, but without starting the engine;

switch coils separated from engagement coils to provide a second magnetic field also controlled by the controller through the power regulator; and which communicates with the switch core of the switch shaft to generate force and movement to move the switch shaft axially in order to position the switch conductor to connect between the two starter-contacts and conduct electricity from the battery to the starter-motor;

a solenoid component comprising:

(a) a magnetically shielded enclosure defined by metal walls and which contains the controller and power regulator for protecting such enclosed parts from environmental hazards within the solenoid component;

(b) an enclosing-shell defining a main enclosure to protect enclosed components from external environmental hazards, and which supports bearings for the switch shaft, and which contains: engagement coils, engagement plunger, starter-contacts, switch conductors, switch shaft, switch coils, and the shielded enclosure; and
(c) at least one bearing within the main enclosure supported by the enclosing shell, each to provide support in all lateral directions to the switch shaft to restrict the switch shaft to move essentially in the axial direction;

a body and integral frame to support and enclose the internal combustion engine, fuel tank, battery seat and other components of the vehicle;

two or more wheels supporting the body and frame of such vehicle at least one of which communicates with the engine to turn the wheels to move the vehicle;

at least one engine air intake region in communication with the engine to provide air for combustion;

an exhaust system to conduct combustion exhausts away from the engine air intake region;

and in which:

the enclosing-shell is constructed to prevent disassembly, and to provide a tamper-proof enclosure so as to prevent unauthorized manipulation of the enclosed components;

the solenoid component, starter-motor, and engine are arranged to enclose engagement coils, engagement plunger, engagement linkage, and engager to prevent unauthorized manipulation of such enclosed components;

at least one one-way fastener is used to attach the solenoid component in a fixed position to the starter-motor at an aperture through an enclosing wall that defines the exterior of the starter-motor; and in which the fastener comprises (a) a front-end, configured to enable attachment of the solenoid component to the starter-motor, utilizing the front-end configuration while accessing the fastener from the exterior of the starter-motor enclosure, and to prevent removal from the exterior of the starter-motor after such attachment; and (b) a back-end, configured to enable removal of the solenoid component utilizing the back-end configuration, while accessing the fastener from the interior of the starter-motor enclosure; and in which removal of the starter-motor is necessary to achieve access to the interior of the starter-motor enclosure to utilize the back-end of the one-way fastener(s) for removal of the solenoid components;

the controller and power regulator are enclosed within the shielded enclosure within the solenoid component to prevent manipulation of such enclosed parts; and a cable from the keyboard is connected through the enclosing-shell to the controller such that the tamper-proof and protective quality of the shielded enclosure is preserved; and there are no external connections which can be directly energized without knowing the authorization code to move the engager; and when a starting-sequence is initiated and code-signals that conform with predefined authorization code requirements have not been received, then the controller enables starter-motor operation while preventing the engager from moving into position-for-starting to sound like normal starting, but without starting the engine, and there are no indications of user error except failure of the engine to start.

30. A one-way lock to prevent unauthorized starting of an internal combustion engine by preventing unauthorized removal of a starting system component attached to a wall surface of a machine which includes such engine, such attachment being in a fixed position relative to a first end of an aperture penetrating through the wall, and in which controlled access to a distal end of the aperture is provided; such lock including:

a shaft for positioning in the aperture and having a front-end communicating with the component to lock the component in a fixed position relative to the wall surface;

attachment means for operating the one-way lock to fix the component to the wall at the aperture exclusively from the front-end of the shaft without requiring access to the distal end of the aperture;

removal means integral with a back-end of the shaft accessible exclusively from the distal end of the aperture providing for removal of the lock from the aperture only after obtaining access to the distal end of the aperture for removing the component from the wall.

31. The one-way lock of claim 30 in which such attachment means include:

(a) external threads for the shaft for engaging internal threads of the aperture for holding the shaft in a fixed position relative to the direction of the aperture through the wall;

(b) a head, integral with a front-end of the shaft, for holding the component in a fixed position relative to the shaft and preventing the utilizing of hand tools for removing the component from the wall from the first-end of the aperture;

(c) means for utilizing a hand tool integral with such head at the front-end of the shaft for rotating the shaft in a first direction for engaging such threads to lock such component to such wall at such aperture;

such removal means include means to engage a hand tool for rotating the shaft in the opposite direction to remove the one-way lock from the aperture for removing the component from the wall.

32. A power-regulator for controlling starter motor engagement to prevent unauthorized starting of an internal combustion engine and for enclosure in an environment which is harsh to electronic components and including no delicate electronic components which would be damaged by such enclosure; and which comprises:

two sets of coils for generating a first magnetic field, and including one set of high current coils and one set of low current coils, and in which both sets of coils can be simultaneously energized, and in which each set of coils is separately connected (a) to enable electromagnetic effects of the coils to cooperate to generate a high strength magnetic field, and (b) to enable the electromagnetic effects of the coils to cancel out to generate a lower strength magnetic field;

a core to generate force and movement, and movable within the first magnetic field generated by the coils and physically communicating with means to generate force to provide that the core moves into an activated position only when both coils are connected to cooperate and energized to generate a high strength magnetic field;

a control-signal input connection means;

a connection for a source of electricity to supply current to energize each set of coils to generate the magnetic field; and a power-regulator consisting essentially of one low current regulator-relay to respond to a control-signal that sets or clears the regulator-relay to modulate flow of energizing current through low current coils;

and in which the regulator-relay, source of energizing current, and each set of coils is electrically connected to provide that:

energizing current flows in series through the regulator-relay and the low current coils only when energizing current flows through the high current coils and the energizing current that flows through the high current coils is not conducted through the regulator-relay;

when energizing current is not flowing through the high current coils, then no current flows through the regulator-relay or through low current coils;

when the regulator-relay is set by a control-signal then the regulator-relay enables energizing current to flow in series through the regulator-relay and the low current coils such that the electromagnetic effects of the current flowing through both sets of coils cooperate to generate a high magnetic field strength sufficient to overcome means to generate force so as to move the core into an activated position; and when the regulator-relay is cleared (not set) by a control-signal then the regulator-relay enables energizing current to flow in series through the regulator-relay and the low current coils, in a direction reverse to the direction of such flow that occurs when the regulator-relay is set, such that the electromagnetic effect of the low current coils cancels out part of the electromagnetic effect of the high current coils to generate magnetic field strength which is lower than when the regulator-relay is set and which is insufficient to overcome means to generate force such that the core does not move into an activated position.

33. A vehicular anti-theft device of a type to prevent the starting of the vehicle's internal combustion engine without inputting a proper code, comprising: p1 a first gear connected to said engine for receiving a rotative movement to start said engine;
a starter motor;
a second gear extending from said starter motor having a first position not in engagement with said first gear and a second position in engagement with said first gear;
at least one source of power;
a first electrical line connecting a respective source of power said starter motor;
a solenoid means for moving said second gear into said second position;
a second electrical line connecting a respective source of power said solenoid;
switch means across said first line connecting said source to said starter motor causing said starter motor to rotate when said switch closes said first electrical line;
first means across said second electrical line preventing said solenoid from moving said second gear from said first position to said second position, said means including:
second means for accepting a given code; and
third means interrupting said second electrical line unless said second means has accepted said given code.

34. The invention of claim 33 wherein said second means is within said solenoid.

35. The invention of claim 33 wherein said solenoid means includes an elongated housing divided into first, second and third chambers
a first core member supported in said first chamber for movement axially thereof
said first core member having an upper end and a lower end,
a second core member supported in said second chamber coaxially with said first core member
said first core member having one end juxtaposed near said chamber and said lower end connected to said first gear means for movement therewith.

36. The invention of claim 33, wherein said means across said second electrical line includes an on/off switch between said respective source of power and said means or accepting a given code.

37. An anti-theft device for a vehicle of a type having an engine; a starter motor; a source of electrical power; a first electrical conduit; and a starter switch across said first electrical conduit for connecting current from said source of power to said starter motor when said switch is in its closed position, comprising:
engagement means for connecting the output from said starter motor to an input to said engine, and;
said engagement means having a first position wherein said output is transferred to said input and a second position wherein said output is not transferred to said input of said engine;
an elongated magnetic shield enclosure affixed to said vehicle;
a solenoid component housed within said elongated enclosure
said elongated enclosure divided into first, second and third chambers,
a first plunger movably mounted in said first chamber and connected to said engagement means;
a ferromagnetic core member carried by said plunger;
a spring means in said first chamber biasing said plunger and said core in a direction causing said engagement means to be in said second position;
a first coil about said core and in said first electrical conduit;
a second coil about said core;
means to energize said first coil and said starter-motor when said starter switch is in said closed position;
a second electric conduit between said source and said second coil;
a second switch intermediate the length of said second electric conduit and said second switch having an open and closed position;
a code input means;
code means to cause said code input means to close said second switch and said second conduit to said second coil so that current will flow in said second coil to develop a sufficient electromagnetic force, together with the current in said first coil to move said ferromagnetic core against the bias of said spring to a position wherein said engagement means is moved to said second position.

* * * * *